(12) United States Patent
Van Rompay (10) Patent No.: US 9,534,579 B2
(45) Date of Patent: Jan. 3, 2017

(54) DEVICE FOR GENERATING HYDROELECTRIC ENERGY

(71) Applicant: Boudewijn Gabriel Van Rompay, Clearwater, FL (US)

(72) Inventor: Boudewijn Gabriel Van Rompay, Clearwater, FL (US)

( * ) Notice: Subject to any disclaimer, the term of this patent is extended or adjusted under 35 U.S.C. 154(b) by 7 days.

(21) Appl. No.: 14/433,880

(22) PCT Filed: Oct. 1, 2013

(86) PCT No.: PCT/IB2013/002163
§ 371 (c)(1),
(2) Date: Apr. 7, 2015

(87) PCT Pub. No.: WO2014/057326
PCT Pub. Date: Apr. 17, 2014

(65) Prior Publication Data
US 2015/0252776 A1 Sep. 10, 2015

(30) Foreign Application Priority Data

Oct. 11, 2012 (BE) .................................. 2012/0683

(51) Int. Cl.
*F03B 13/00* (2006.01)
*H02P 9/04* (2006.01)
(Continued)

(52) U.S. Cl.
CPC ........... *F03B 17/063* (2013.01); *F03B 13/264* (2013.01); *F05B 2240/302* (2013.01);
(Continued)

(58) Field of Classification Search
USPC .................. 290/43, 54; 415/7; 416/110–119
See application file for complete search history.

(56) References Cited

U.S. PATENT DOCUMENTS

| 4,517 A | * | 5/1846 | Hand | ....................... B63H 1/04 |
| | | | | 415/141 |
| 113,284 A | * | 4/1871 | Folsom | ................. F03B 13/264 |
| | | | | 415/141 |

(Continued)

FOREIGN PATENT DOCUMENTS

| BE | 101387 | 10/2001 |
| BE | 20100423 | 7/2010 |

(Continued)

OTHER PUBLICATIONS

English Abstract of BE 101387.
(Continued)

*Primary Examiner* — Pedro J Cuevas
(74) *Attorney, Agent, or Firm* — Preston Smirman; Smirman IP Law, PLLC (57) ABSTRACT

Device for generating hydroelectric energy making use of the current of a river (11), estuary or similar, and this device comprises a paddlewheel (2) that can freely turn in two directions around a shaft X-X', and comprises at least one electricity generator set (4) whose drive shaft (8a) is coupled to the shaft (3) of the paddlewheel, whereby the device (1) is further provided with means to keep the paddlewheel (2) in place against the current, characterized in that the paddlewheel (2) is self-floating.

14 Claims, 6 Drawing Sheets

(51) Int. Cl.
*F03B 17/06* (2006.01)
*F03B 13/26* (2006.01)
*F03B 13/10* (2006.01)

(52) U.S. Cl.
CPC ..... *F05B 2240/313* (2013.01); *F05B 2240/40* (2013.01); *F05B 2240/93* (2013.01); *F05B 2240/931* (2013.01); *F05B 2240/97* (2013.01); *Y02E 10/28* (2013.01)

(56) References Cited

U.S. PATENT DOCUMENTS

| | | | | |
|---|---|---|---|---|
| 302,769 | A * | 7/1884 | Pallausch | F03D 3/067 415/141 |
| 1,157,416 | A * | 10/1915 | Olive | 415/7 |
| 1,265,114 | A * | 5/1918 | Riddle | B64C 27/54 416/112 |
| 1,334,595 | A * | 3/1920 | Canaday | F03B 17/063 416/246 |
| 3,604,942 | A * | 9/1971 | Nelson | F03B 17/065 290/54 |
| 3,692,427 | A * | 9/1972 | Risse | B01F 7/00058 415/141 |
| 3,976,396 | A * | 8/1976 | Antogini | F03D 3/067 415/141 |
| 4,023,041 | A * | 5/1977 | Chappell | F03B 13/184 290/42 |
| 4,048,947 | A * | 9/1977 | Sicard | F03B 17/065 180/2.2 |
| 4,203,707 | A * | 5/1980 | Stepp | F03D 3/067 416/119 |
| 4,241,283 | A * | 12/1980 | Storer, Sr. | E02B 9/04 290/43 |
| 4,383,797 | A * | 5/1983 | Lee | F03B 17/062 405/22 |
| 4,619,585 | A * | 10/1986 | Storm | F03D 7/06 416/119 |
| 4,717,831 | A * | 1/1988 | Kikuchi | F03B 13/184 290/53 |
| 4,776,762 | A * | 10/1988 | Blowers, Sr. | F03D 3/068 416/119 |
| 4,843,249 | A * | 6/1989 | Bussiere | F03B 13/183 290/42 |
| 5,051,059 | A * | 9/1991 | Rademacher | F03B 17/062 415/3.1 |
| 5,057,696 | A * | 10/1991 | Thomas | F03D 3/02 290/44 |
| 5,098,264 | A * | 3/1992 | Lew | F04C 2/44 416/119 |
| 5,425,619 | A * | 6/1995 | Aylor | F03D 1/00 416/117 |
| 5,430,332 | A * | 7/1995 | Dunn, Jr. | F03B 7/00 290/43 |
| 5,440,175 | A * | 8/1995 | Mayo, Jr. | F03B 7/003 290/53 |
| 5,463,257 | A * | 10/1995 | Yea | F03D 3/0418 290/44 |
| 5,676,524 | A * | 10/1997 | Lukas | F03D 3/068 416/111 |
| 6,006,518 | A * | 12/1999 | Geary | F03B 17/065 290/42 |
| 6,019,305 | A * | 2/2000 | Palliser | B60R 22/4628 242/374 |
| 6,069,409 | A * | 5/2000 | Fowler | F03D 3/002 290/44 |
| 6,208,037 | B1 * | 3/2001 | Mayo, Jr. | E02B 9/00 290/42 |
| 6,499,939 | B2 * | 12/2002 | Downing | F03B 17/065 415/3.1 |
| 7,081,690 | B2 * | 7/2006 | Coman | F03B 17/063 290/54 |
| 7,083,382 | B2 * | 8/2006 | Ursua | F03D 3/005 416/110 |
| 7,223,137 | B1 * | 5/2007 | Sosnowski | B63B 35/44 290/54 |
| 7,385,302 | B2 * | 6/2008 | Jonsson | F03D 3/068 290/42 |
| 7,462,949 | B2 * | 12/2008 | Coman | F03B 17/063 290/54 |
| 7,550,865 | B2 * | 6/2009 | Jonsson | F03D 3/068 290/42 |
| 7,591,635 | B2 * | 9/2009 | Ryu | F03D 3/068 416/111 |
| 7,696,633 | B2 * | 4/2010 | Zajchowski | F03B 17/063 290/43 |
| 7,780,411 | B2 * | 8/2010 | Yan | F03D 3/067 415/1 |
| 7,855,468 | B2 * | 12/2010 | Lin | F03B 17/065 290/43 |
| 7,918,648 | B1 * | 4/2011 | Simnacher | F03D 3/067 416/111 |
| 7,928,594 | B2 * | 4/2011 | Shreider | F03B 11/08 290/43 |
| 7,942,624 | B1 * | 5/2011 | Erb | F03D 3/068 415/4.2 |
| 7,969,034 | B2 * | 6/2011 | Winius | F03B 17/063 290/43 |
| 8,016,544 | B1 * | 9/2011 | Nguyen | F03D 3/067 415/130 |
| 8,076,791 | B2 * | 12/2011 | Hostetler | F03B 17/067 290/54 |
| 8,120,196 | B1 * | 2/2012 | Neese | F03B 13/183 290/53 |
| 8,269,362 | B2 * | 9/2012 | Cai | F03D 3/005 290/44 |
| 8,350,396 | B2 * | 1/2013 | Dempster | F03B 7/00 290/43 |
| 8,419,367 | B2 * | 4/2013 | Fite | F03B 17/065 416/119 |
| 8,480,363 | B2 * | 7/2013 | Fenaughty | F03D 3/067 415/1 |
| 8,552,579 | B2 * | 10/2013 | Richter | F03D 3/067 290/44 |
| 8,602,719 | B2 * | 12/2013 | Kelly | F03D 3/068 415/4.2 |
| 8,657,575 | B2 * | 2/2014 | Morris | F03B 17/06 416/79 |
| 8,772,957 | B2 * | 7/2014 | Willingham | F03B 17/063 290/55 |
| 8,829,704 | B2 * | 9/2014 | Grigg | F03D 3/002 290/44 |
| 8,841,793 | B2 * | 9/2014 | Wang | F03B 13/10 290/43 |
| 8,933,575 | B2 * | 1/2015 | Lipman | F03B 13/264 290/54 |
| 8,943,824 | B2 * | 2/2015 | Isik | F03B 17/065 290/54 |
| 8,957,541 | B1 * | 2/2015 | Jacobsen | F03B 13/00 290/54 |
| 9,228,560 | B2 * | 1/2016 | Willingham | F03B 17/063 |
| 2005/0017513 | A1 * | 1/2005 | Sipp | F03B 17/063 290/54 |
| 2006/0119107 | A1 * | 6/2006 | Coman | F03B 17/063 290/54 |
| 2007/0029806 | A1 * | 2/2007 | Coman | F03B 17/063 290/54 |
| 2008/0309089 | A1 * | 12/2008 | Lin | F03B 17/065 290/54 |
| 2009/0322093 | A1 * | 12/2009 | Winius | F03B 17/063 290/54 |
| 2010/0084870 | A1 * | 4/2010 | Burcik | F03B 17/06 290/54 |
| 2010/0237625 | A1 * | 9/2010 | Dempster | F03B 7/00 290/54 |
| 2013/0229014 | A1 * | 9/2013 | Willingham | F03B 17/063 290/54 |
| 2013/0241206 | A1 * | 9/2013 | Tkadlec | F03B 17/063 290/54 |

(56) References Cited

U.S. PATENT DOCUMENTS

| | | | | |
|---|---|---|---|---|
| 2013/0285382 A1* | 10/2013 | Grigg | ...................... | F03D 3/002 290/54 |
| 2015/0008675 A1* | 1/2015 | Willingham | .......... | F03B 17/063 290/54 |
| 2016/0138559 A1* | 5/2016 | Bauer | .................... | F03B 13/00 290/43 |
| 2016/0141986 A1* | 5/2016 | Bergman | ................. | H02P 9/06 290/43 |
| 2016/0141987 A1* | 5/2016 | Bergman | ................ | F03B 13/00 290/43 |
| 2016/0201639 A1* | 7/2016 | Hong | ...................... | F03B 13/00 290/54 |

FOREIGN PATENT DOCUMENTS

| | | |
|---|---|---|
| GB | 12249 | 0/1912 |
| GB | 1518268 | 7/1978 |
| GB | 2448393 | 10/2008 |
| JP | S59221472 | 12/1984 |
| WO | 2010114496 | 10/2010 |

OTHER PUBLICATIONS

English Abstract of JP S59221472.
Boudewijn Gabriel Van Rompay, "Surface Treated Composites White Book," 2012, Tahoka Press, Clearwater, Florida, United States of America.

* cited by examiner

DEVICE FOR GENERATING HYDROELECTRIC ENERGY

CROSS-REFERENCE TO RELATED APPLICATION

The instant application is a national phase of PCT International Patent Application Serial No. PCT/IB2013/002163, filed Oct. 1, 2013, and claims priority to Belgian Patent Application Serial No. 2012/0683, filed Oct. 11, 2012, the entire specifications of both of which are expressly incorporated herein by reference.

The present invention relates to a device for generating hydroelectric energy.

More specifically the invention is intended for generating hydroelectric energy making use of the current of a river, estuary or similar.

Devices for generating electric power that make use of solar or wind energy are already known.

A disadvantage of such devices is that the electric power generation is highly dependent on the weather conditions: at night or in the event of clouds little or no solar energy can be generated, and in the absence of wind or during stormy weather no wind energy can be generated.

A disadvantage of this is that the energy supply cannot be continuously guaranteed such that the storage of energy is necessary to guarantee the energy supply at times when electric power generation is not possible.

With wind turbines an additional disadvantage is that they can cause noise pollution and that they greatly disturb the view of the environment.

Furthermore, the installation of offshore wind farms requires high investments for installation and maintenance. Moreover the transmission of the generated energy to land is expensive due to the sizeable cables that are required to transport the generated energy over large distances under water.

Alternatively devices are also known that make use of the flow of water to generate energy. A practical example of such a device is a hydropower station.

Such a hydropower station requires the creation of reservoirs in rivers using one or more dams.

The location of these reservoirs must be carefully selected and not all rivers are suitable for them.

These reservoirs can also have detrimental effects on nature, because the natural habitat of aquatic animals and plants is disturbed.

These reservoirs also mean a large loss of land area such that many villages or towns often have to be relocated and these reservoirs can also constitute a hazard in the event of the failure of the dams.

Moreover, the hydropower station and the dams are large and complex structures, such that the construction of such an installation is an expensive, long and complicated matter.

Additionally, such a hydropower station constitutes an impediment for water transport.

The turbines used are also partly underwater, which means that the turbines and the generators connected to them must be carefully sealed, which complicates maintenance or repairs.

The purpose of the present invention is to provide a solution to one or more of the aforementioned and other disadvantages.

To this end the invention concerns a device for generating hydroelectric energy making use of the current of a river, estuary or similar, whereby the device comprises a paddlewheel that can freely turn in two directions around a shaft, and comprises at least one electricity generator set whose drive shaft is coupled to the shaft of the paddlewheel, whereby the device is further provided with means to keep the paddlewheel in place against the current, and whereby the paddlewheel is self-floating.

An advantage of such a device according to the invention is that it encroaches less on the environment because it is smaller than the known wind turbines and does not require an adaptation of the environment, as is the case with hydropower stations for which a reservoir is necessary.

Because the device is compact, such a device does not, or not appreciably, impede boats sailing on the river, as such a device can preferably be installed along the bank.

An advantage of the paddlewheel being self-floating is that at least a part of its own weight is neutralised by the upward force of the water, such that the load on the bearings in which the paddlewheel shaft is mounted is reduced, or even completely neutralised. This contributes to a reduction of losses in the bearings, such that more hydraulic energy is available for driving the generator set or sets, which results in more electric power being generated by the generator set or sets.

Another advantage of being self-floating is that the paddlewheel will not cause any, or hardly any, damage to the marine environment.

Another advantage is that the device can be stationed close against a bank or dry land such that the transmission of the generated energy to the electricity grid is much cheaper and more efficient, because it is closer to the electricity grid so that shorter cables are required under water to make a connection to the closest power station on dry land. Moreover fewer losses will occur in the cable, such that the efficiency is higher.

According to a preferred embodiment the paddlewheel is equipped with a number of radially oriented paddles, and at least one of which is always partially in the water during use. In this way the paddlewheel can be set into motion by the water, without it being necessary to place the shaft of the paddlewheel under water. This provides the advantage that the device is very simple which makes its construction cheap. Indeed, aside from the paddles of the paddlewheel there are no other moving parts that are under water, such that no extra attention is required for sealing and other measures to prevent the harmful effects of water. In addition, the maintenance is consequently quite simple to do as there are few moving parts and the majority of the device is above water, such that it is easily accessible without extra facilities.

Such a device can also be assembled on land and then taken as a whole to a suitable place in the river.

Preferably the paddles are flat blades. Due to the fact that these flat blades are radially oriented and parallel to the shaft of the paddlewheel, these blades can take the entire force of the water by being transverse to the current.

In addition the paddles are rotatable at their base with respect to the shaft by means of a hinge mechanism, and an adjustment mechanism is provided that enables the angle of rotation of the paddles with respect to the radial direction to be locked in a certain rotated position.

Depending on the direction of rotation of the paddlewheel the paddles are folded in the one direction or in the other direction such that they can better transmit the force of the current.

In addition the paddles are composed of 2 or more segments that are rotatable, by means of a hinge mechanism, with respect to one another around a geometric axis parallel to the shaft of the paddlewheel, and that an adjustment mechanism is provided to be able to lock the angle between the segments in a given position.

An advantage of this is that the geometry can be optimally set as a function of the speed of the current.

According to a preferred characteristic the generator set or sets are affixed on a floating structure, whereby the floating capacity of the paddlewheel and the floating capacity of the supporting structure are such that, when the paddlewheel and the supporting structure with the generator set or sets float separately and freely on the water, the height of the shaft of the paddlewheel corresponds to the height of the drive shafts of the generator set or sets.

An advantage of this is that the weight of the paddlewheel is completely neutralised by the upward force, such that the coupling between the paddlewheel and the drive shaft of the generator set and the bearings of these drive shafts are completely unloaded in the vertical direction. As a result, there is less energy loss due to friction and more useful energy is thus available for conversion into electric power. Moreover the device is subject to lower forces such that the device can be made lighter.

According to another preferred characteristic the generator set or sets are direct current generator set or sets whose electricity supply is connected to an inverter that converts the direct current to alternating current that is suitable to be pumped into the public electricity grid. Such an inverter can be provided in a sheltered place on the bank and connected to or form part of a high voltage cabin.

Preferably the generator set or sets are provided on either side of the paddlewheel, whereby the drive shaft of at least one generator set turns in a first direction of rotation with the shaft of the paddlewheel and can freely turn in the other second direction of rotation, and the drive shaft of at least one generator set that can freely turn in the first direction of rotation and turns with the shaft of the paddlewheel in the second direction of rotation.

An advantage of this is that electrical energy can always be generated both in the event of a current in the upstream direction and in the downstream direction as at least one generator will always be driven by the paddlewheel.

Alternatively the generator set can comprise a transmission between the generator and the shaft of the paddlewheel and the transmission comprises a mechanism to reverse the direction of rotation of the shaft of the generator with respect to the paddlewheel in order to ensure that the generator is always driven in the same direction of rotation irrespective of the direction of rotation of the paddlewheel.

This has the advantage that each generator set will always be able to generate electric power, irrespective of the direction of flow of the river.

Only upon the reversal of the flow due to the effects of the tide can there be a power interruption for a short period because, as is known, the current can then stop locally during the transition between ebb and flow. However, this shortcoming can be accommodated by combining a number of similar devices spread over a distance of the river so that at least one device always experiences a current in the river. It is known in particular that the reversal of the flow is localised and that the place where this reversal takes place moves along the river.

In order to keep the paddlewheel in place there are two preferred embodiments.

In a first preferred embodiment the means to keep the paddlewheel in place are formed by two posts that form a guide for an up-and-down movement of the supporting structure.

An advantage of this is that such posts are quite simple to anchor in the riverbed and that they guide the supporting structure in a relatively simple way along the post to ensure that the paddlewheel can freely move in the vertical direction in order to be able to follow the height of the tidal river.

In a second embodiment the means to keep the paddlewheel in place are formed by a least one or more anchor chains that are fastened to the supporting structure.

Preferably a number of paddlewheels can be combined with the supporting structure, and these paddlewheels are positioned with their shafts parallel to one another and behind one another with respect to the direction of flow.

According to a preferred characteristic the parts of the device that are placed under water or which come into contact with water are treated with a non-toxic coat of paint based on a surface-treated composite coating, such as a coating described in "Surface Treated Composites WHITE BOOK," Boud Van Rompay, 2012 (Tahoka Press), for example.

Due to the maintenance-friendly properties of the aforementioned coat of paint, growth can easily be removed, for example according to the methods in patent BE 1013187 and patent application BE 2010/0423 of the present patent applicant. This will ensure that the maintenance of the device can be done quickly, all the more so because the majority of the paddles and the paddlewheel are above water.

Moreover, environmental pollution is ruled out by the non-toxic nature of the coat of paint.

Furthermore, the coat of paint also has highly corrosion-resistant properties, such that the paddles that are treated with this paint will wear less due to rust. As a result the paddles can be made thinner such that the device is lighter.

With the intention of better showing the characteristics of the invention, a few preferred embodiments of the invention are described hereinafter by way of an example, without any limiting nature, with reference to the accompanying drawings, wherein.

Figure 1:
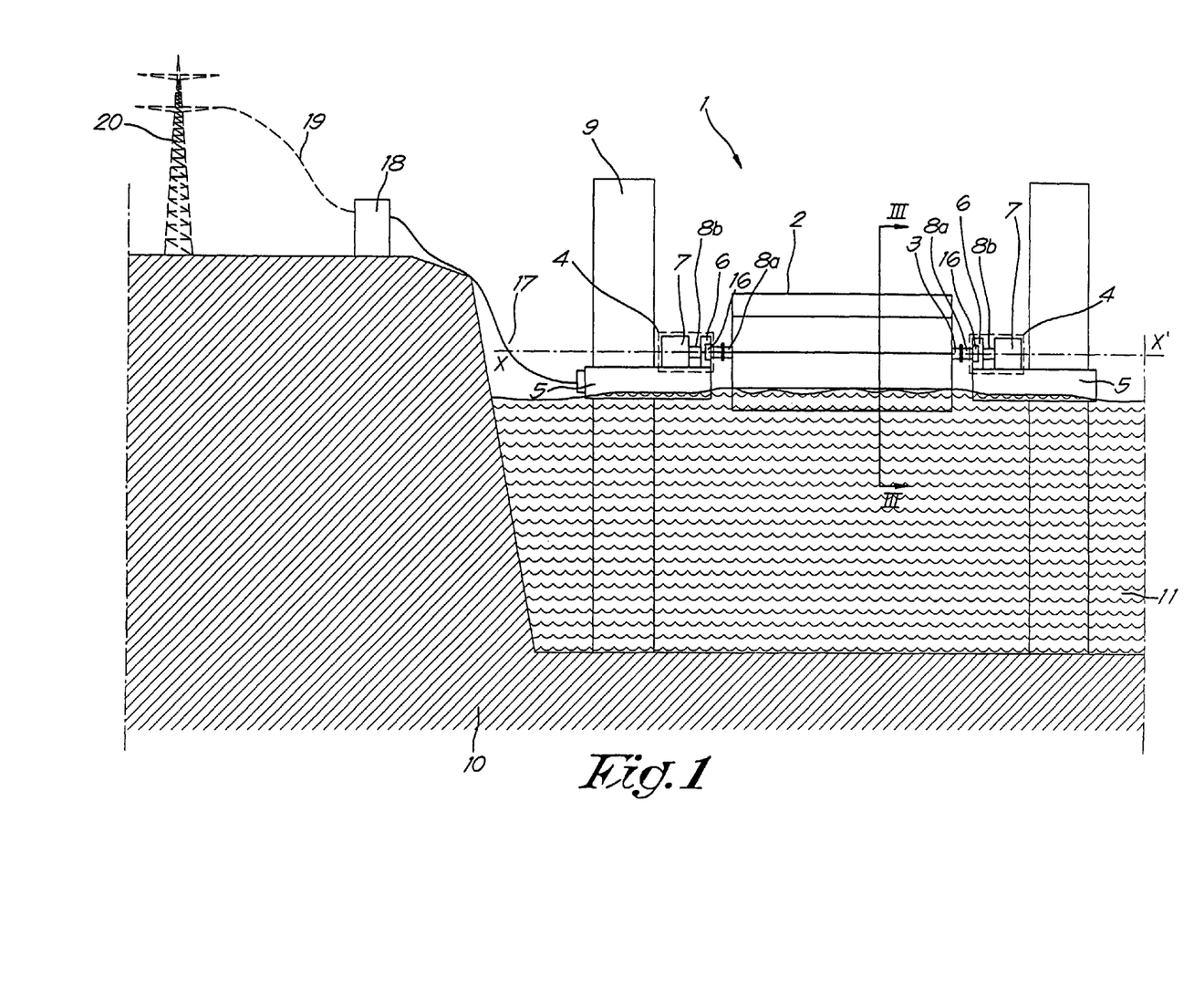
FIG. 1 schematically shows a preferred embodiment of a device according to the invention for generating hydroelectric energy whereby the device is placed in a tidal river.
Figure 2:
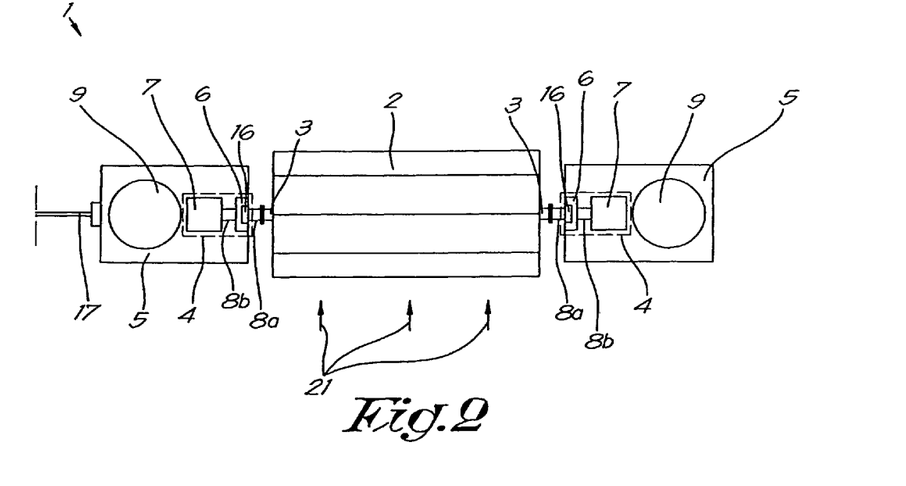
FIG. 2 shows a top view of the device of FIG. 1.
Figure 3:
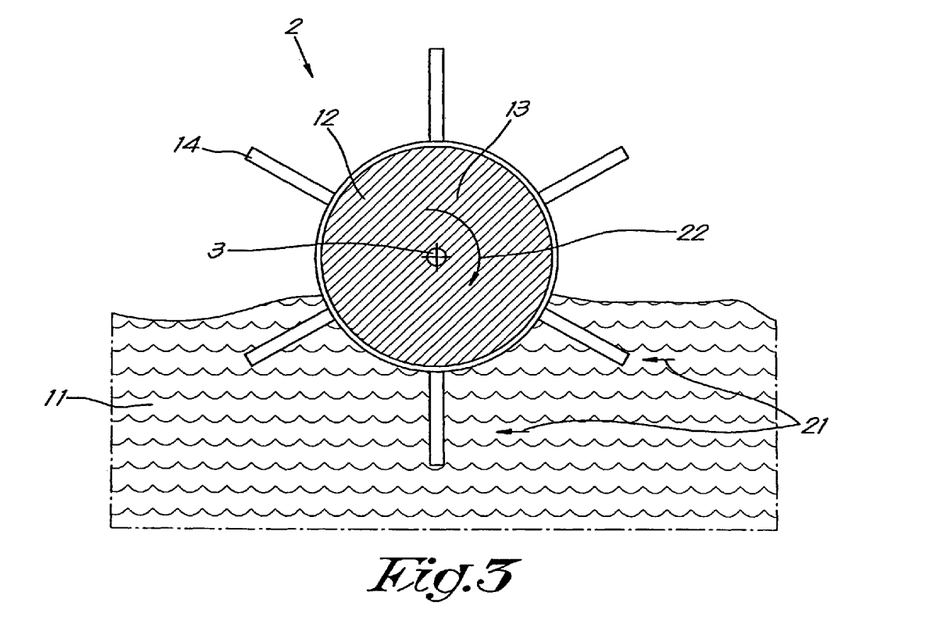
FIG. 3 shows a cross-section according to line of FIG. 2.

The device 1 shown in FIGS. 1 to 3 primarily consists of a self-floating paddlewheel 2 that can turn freely in two directions around an axis X-X', and which is provided with a shaft 3 that is coupled to a generator set at both ends, and this generator set 4 is placed on a floating structure 5. The generator set 4 consists of a transmission 6 with a generator 7 connected to it. The transmission 6 is equipped with an incoming drive shaft 8a that is coupled to the shaft 3 of the paddlewheel 2 and an outgoing shaft 8b that is coupled to the shaft of the generator 7.

The floating supporting structure 5 can freely move up and down in the vertical direction and to this end is guided around a post 9 that is anchored to the bed 10 of the river 11.

In this case the paddlewheel 2 is floating because the shaft 3 of the paddlewheel 2 is constructed cylindrically with a cavity that is filled with a floating material 13, as shown in FIG. 3, or which alternatively can be constructed as a closed cylinder that is filled with air or another gas.

The paddlewheel 2 in the example shown in FIGS. 1 to 3 is equipped with radially oriented flat paddles 14 that extend in the longitudinal direction parallel to the shaft 3 of the paddlewheel 2. The paddlewheel 2 is designed such that the floating capacity of the paddlewheel 2 is sufficient to keep the shaft 3 of the paddlewheel 2 above water and to ensure that at least one of the aforementioned paddles 14 is always in the water.

Preferably the floating capacity of the paddlewheel 2 is calculated such that when the paddlewheel 2 floats independently on the water, its shaft is at the same or practically the same height of the drive shaft 8a of the one or more generator sets 4 when the supporting structure 5, with the generator sets 4 on it and possibly other infrastructure, floats independently on the water. This ensures that the shaft 3 of the paddlewheel 2 can be coupled to the drive shaft 8a without vertical forces having to be exerted and that the generator set 4 does not have to bear the weight of the paddlewheel 2.

According to an aspect of the invention the transmission 6 comprises a mechanism for reversing the direction of rotation of the shaft 8b of the generator 7 with respect to the paddlewheel 2 to ensure that the generator 7 is always driven in the same direction of rotation irrespective of the direction of rotation of the paddlewheel 2.

If applicable this mechanism is constructed as a freewheel 16 that enables a free rotation of the shaft 8a of the generator set 4 with respect to the shaft 3 of the paddlewheel 2 in one direction and forms a fixed turning coupling between the generator set 4 and the paddlewheel 2 in the other direction of rotation.

The generator set 4 is preferably a direct current generator set that is connected by an electric cable 17 to an inverter 18 on the bank that converts the direct current supplied into alternating current, which can be supplied to the electricity grid 20 via a cable 19.

The operation of the device 1 according to the invention is very simple and as follows.

When the device 1 is placed in a river 11 as shown in FIG. 1, the current will make the paddlewheel 2 turn.

It is known that during certain periods tidal rivers flow out to the sea and during other periods flow in the reverse direction away from the sea. This means that the paddlewheel 2 will be driven in one direction of rotation around the axis X-X' during certain periods and in the reverse direction of rotation during other periods.

In the case of FIGS. 1 to 4, the water flows in the direction of arrow 21 such that the paddlewheel 2 is driven in the direction of rotation of arrow 22. In this case, due to the action of the freewheel 16 the left generator set 4 of FIG. 1 is driven by the paddlewheel 2, while the right generator set 4 of FIG. 1 will not be driven. In this case, the left generator set 4 will generate electric power, which after conversion in the inverter 18 is supplied to the electricity grid 19.

The transmission 6 is designed such that the speed of the paddlewheel 2 is transmitted to the generator 7 with a certain transmission ratio in order to drive the generator 7 at a suitable and preferably constant speed for the generation of electric power.

When the tide reverses, the direction of flow will reverse in the direction opposite to that of arrow 21, such that the paddlewheel 2 will also be driven in the opposite direction of rotation of the arrow 22. In this case the right generator set 4 will be the one that is driven by the paddlewheel 2 and the left generator set 4 can turn freely with respect to the paddlewheel 2 due to the action of the freewheel 16 and is thus not driven. In this case the electric power will be generated by the right generator set 4 while the left generator set 4 will not generate any electric power.

It is thus clear that, whatever the direction of the flow 21 may be, electric power will always be supplied by one of the two generator sets 4, such that electricity is supplied to the electricity grid 20 continuously.

It is also known that the water level of a river moves up and down, whereby the device 1 can follow these movements thanks to the floating nature of the paddlewheel and the floating structures 5 along the posts 9 that ensure that the device 1 is held in place in order to prevent it being carried along with the current.

Figure 4:
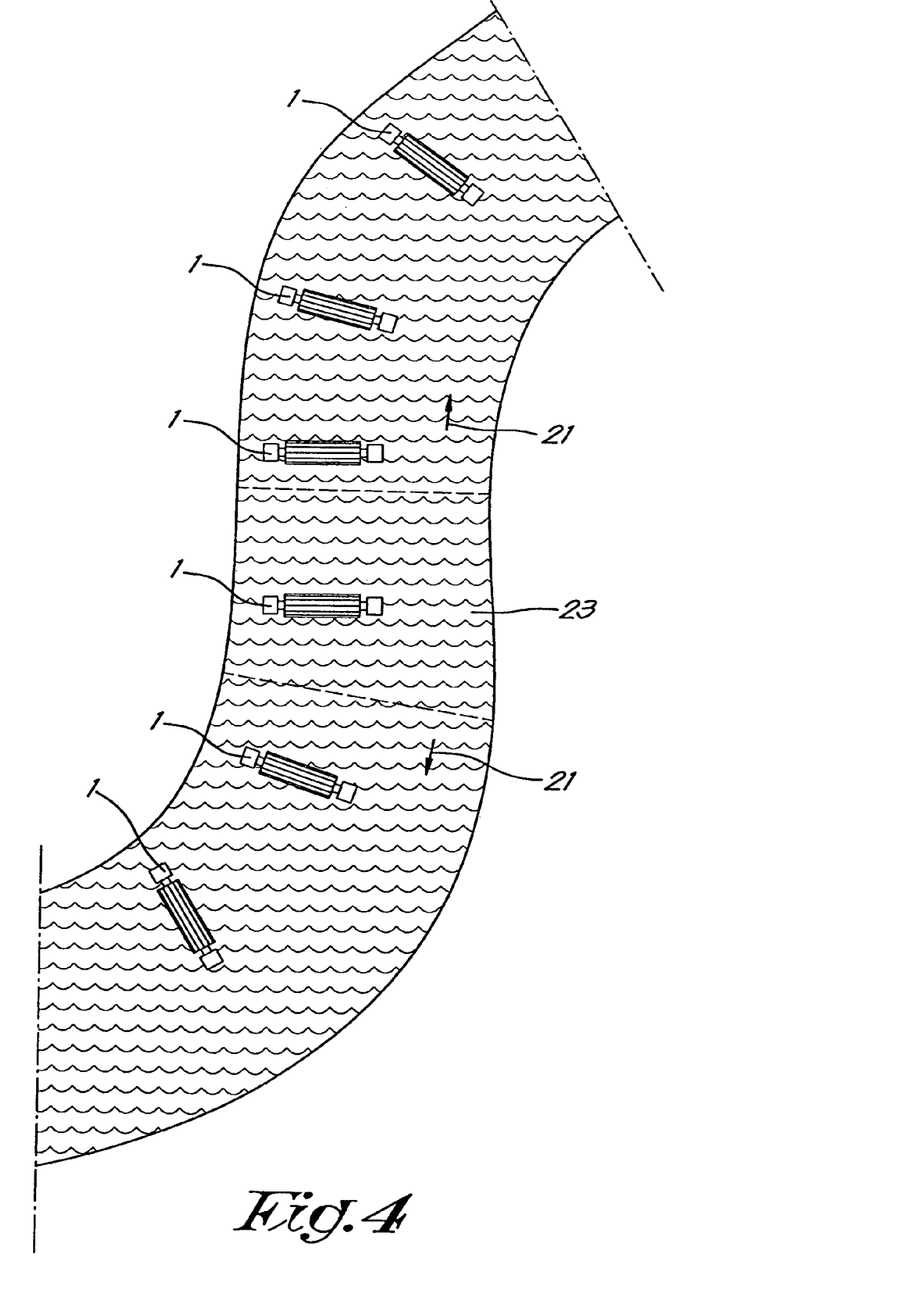
FIG. 4 shows a top view of a river in which a combination of devices according to FIG. 1 are placed.

Preferably a series of aforementioned devices 1 according to the invention are spread over a distance of the river 11, as shown in FIG. 4.

Upon the turn of the tide there will always be a zone 23, as shown in FIG. 4, in which the flow stops so that the device 1 that is in this zone is temporarily out of use, for a period of around twenty minutes for example.

However, it is known that this zone 23 is localised and moves along the river 11, so that in the case of FIG. 4 there will always be devices 1 that are outside the zone 23 of stationary water and are consequently driven by the current, at least if the distance between the devices 1 is chosen to be sufficiently large.

In this way a continuous supply of electric power is assured as a few devices are always in service and only a limited number are temporarily out of service when located in a zone 23.

Preferably the parts of the posts 9 that are under water and the paddles of the paddlewheel 2 are treated with a non-toxic coat of paint based on a surface-treated composite coating so that the maintenance of the parts under water is quite limited and can be done quickly, and the lifetime of the device can be drastically increased.

Figure 5:
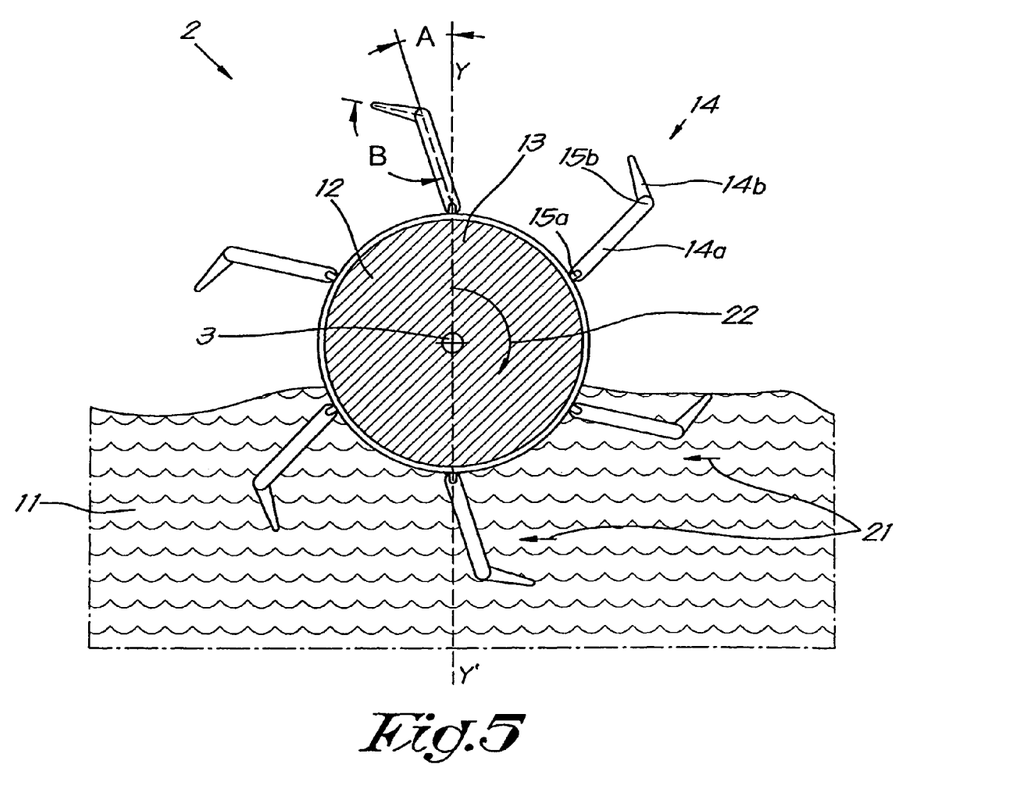
FIG. 5 shows a cross-section according to line of FIG. 2 according to an alternative embodiment.

FIG. 5 shows an alternative embodiment of the paddlewheel 2 of a device 1 according to the invention whereby in this case the paddles 14 are not flat but whereby the paddles 14 are rotatable at their base by means of a hinge mechanism 15a with which the paddles 14 are fastened to the shaft 3 of the paddlewheel 2. Furthermore, an adjustment mechanism is provided that is not shown in the drawings and which enables the angle of rotation A of the paddles 14 with respect to the radial direction Y-Y' to be locked in a certain rotated position.

Additionally, but not necessarily, in this alternative embodiment of FIG. 5 the paddles 14 are segmented with two segments 14a, 14b in this case, which are rotatable with respect to one another by means of a hinge mechanism 15b around a geometric axis parallel to the shaft 3 of the paddlewheel 2. An adjustment mechanism not shown in the drawing is provided to be able to lock the angle B between the segments 14a, 14b in a given position.

In this way the position of the paddles 14 and the geometry of the paddles 14 can be adjusted to the given conditions of the local current in order to be able to optimise the efficiency of the device 1. It is clear that more than two segments are also possible.

Figure 6:
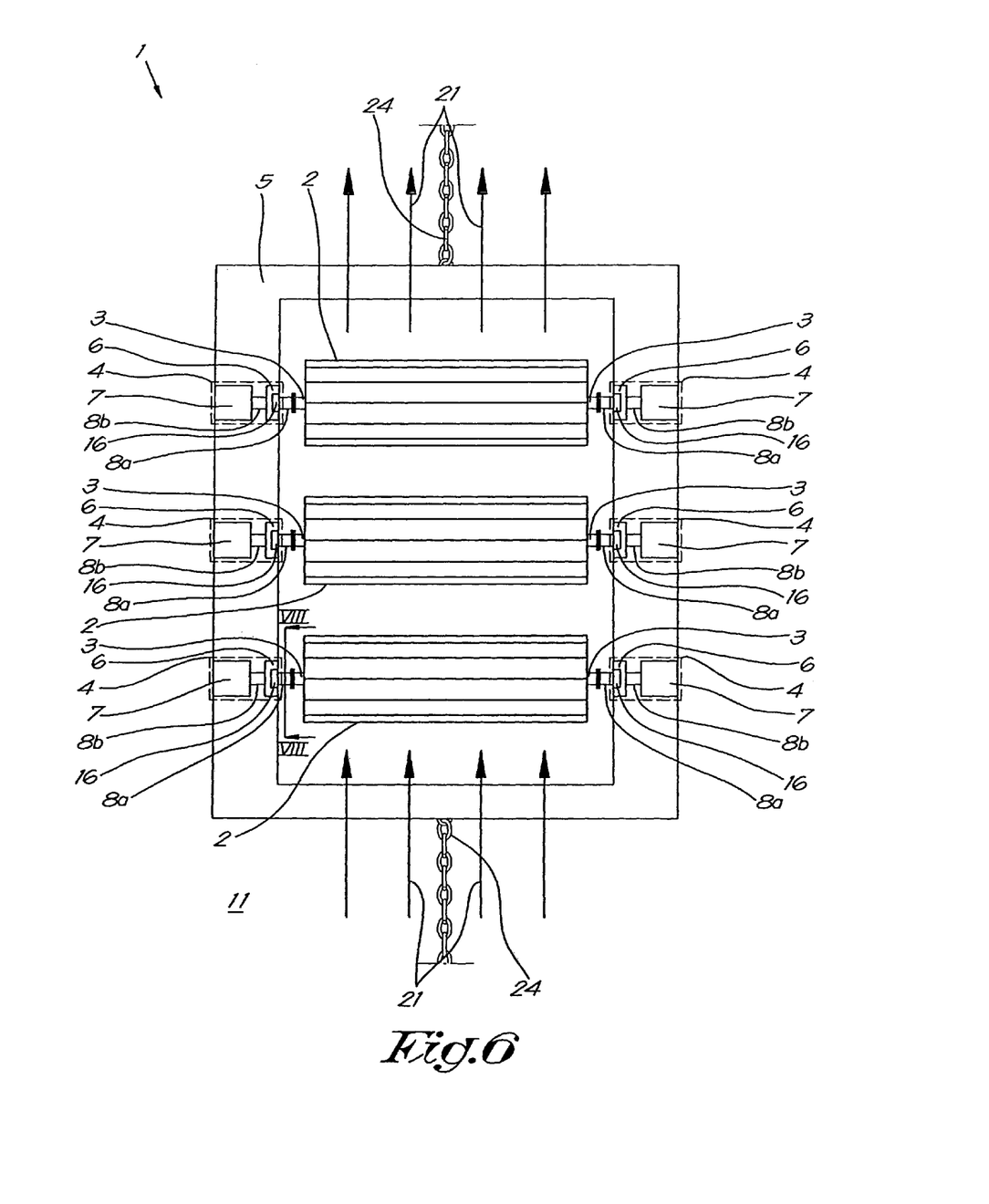
FIG. 6 schematically shows a variant of the device according to the invention.

FIG. 6 shows another preferred embodiment of the invention with a number of paddlewheels 2, which each consists of a central floating cylinder with a multitude of radially oriented paddles, with two generator sets 4 that are placed on either side of each paddlewheel 2 on a floating supporting structure 5 and connected to the shaft 3 of a paddlewheel 2 via a freewheel 15, whereby the floating supporting structure 5 is held in place with respect to the riverbed 10 by at least one, in this case by two, anchor chains 24.

The different paddlewheels 2 are positioned with their shafts 3 parallel to one another and behind one another with respect to the direction of flow.

The operation of this embodiment is analogous to the embodiment of FIG. 1 described above. By selecting the length of the anchor chains 24 in such a way, the floating supporting structure 5 will move with the rise and fall of the water level of the tidal river 11.

As a result of this embodiment, for each device 1 a number of generator sets 4 can generate electrical energy simultaneously, which will increase the total power per device.

In this embodiment a number of these devices 1 can also be placed behind one another in a tidal river 11 to generate the desired quantity of electrical energy. The generated electrical energy can also be transmitted easily and efficiently to the electricity grid 19.

Figure 7:
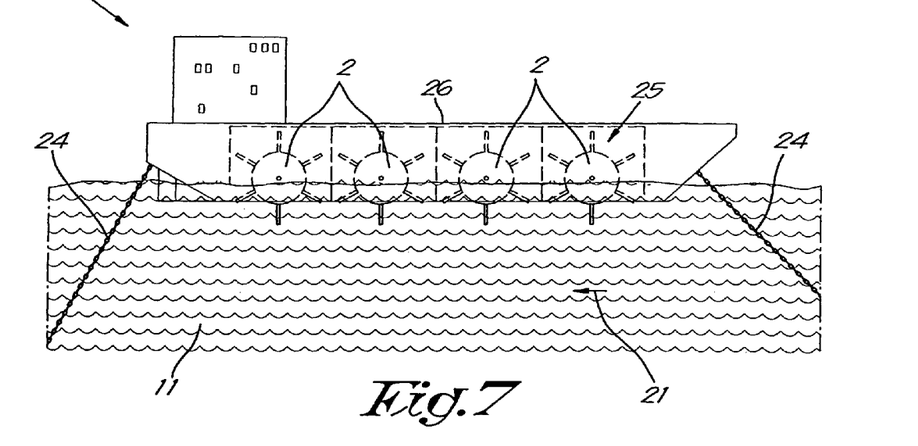
FIG. 7 schematically shows another variant of the device according to the invention.

FIG. 7 schematically shows a variant embodiment of the device 1, whereby the supporting structure 5 is formed by a ship with an open space 25 oriented downwards from the hull in which paddlewheels 2 are affixed that are coupled to generator sets 4 that are carried by the ship. Using one or more anchor chains 24 the ship can be kept in place with respect to the riverbed 10. Here too the various paddlewheels 2 are positioned with their shafts parallel to one another and behind one another place with respect to the direction of flow.

The aforementioned space 25 can be covered along the top, for example by means of hatches 26, so that the paddlewheels 2 are hidden from the view of bystanders and gives the impression that the device 1 according to the invention is a normal ship.

It is clear that in the embodiments described above, the device can be incorporated under a dome or other cover, that can ensure that the device 1 has no disruptive effect on the environment.

It is also clear that the aforementioned mechanism to reverse the direction of rotation of the shaft 8b of the generator 7 can be constructed in other forms than the freewheel 16 described above, whereby the transmission 6 can for example be provided with a reversal of the direction of rotation of the outgoing shaft 8b with respect to the incoming shaft 8a, that can be switched over by means of a relay control depending on the direction of rotation of the paddlewheel 2 that is determined by the direction of flow of the river 11.

It is also clear that a device 1 according to the invention can also be used in rivers without tidal action or in estuaries or similar.

It is also clear that the generator set 4 does not necessarily have to comprise a transmission 6, but that the shaft 3 of the paddlewheel 2 can also be coupled to the shaft 8b of the generator 7 directly or only through the intervention of a freewheel 16.

Figure 8:
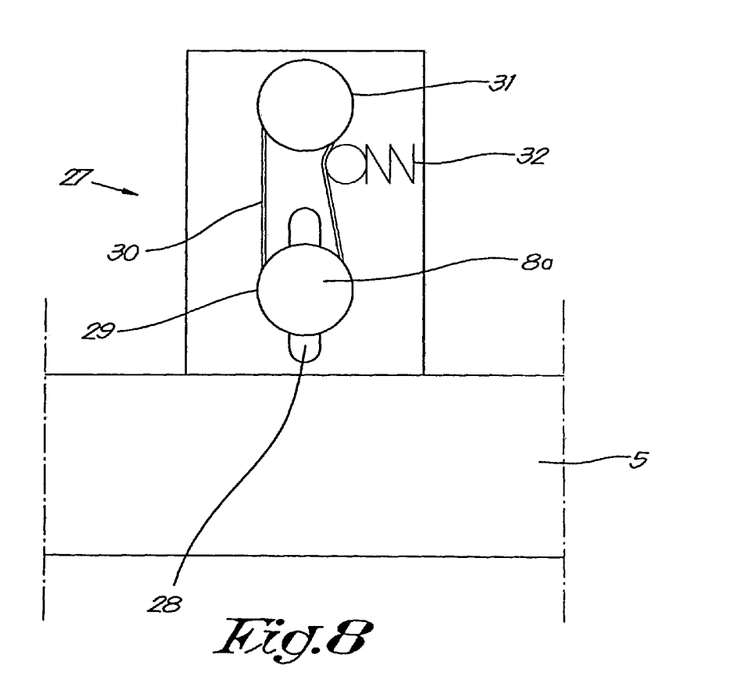
FIG. 8 schematically shows a cross-section according to line VIII-VIII of FIG. 6.

FIG. 8 shows an optional embodiment of a transmission that is also provided with a drive 27 that enables the incoming shaft 8a of the transmission to freely move up and down.

In the example of FIG. 8 this is formed by the incoming shaft 8a being held in a vertical guide 28 of the transmission 6 and that this incoming shaft 8a is provided with a belt pulley 29 over which a belt 30 is guided that engages with a fixed belt pulley 31 of the transmission, and whereby the belt is kept under tension by means of a spring-loaded belt tensioner 32.

In this way level differences between the shaft 3 of the paddlewheel 2 and the supporting structure 5 can be accommodated without large vertical forces being developed between the shaft 3 of the paddlewheel 2 and the incoming shaft 8a of the transmission 6 due to the different movements of the paddlewheel 2 and the supporting structure 5 on the water.

The present invention is by no means limited to the embodiments described as an example and shown in the drawings, but a device for generating hydroelectric energy according to the invention can be realised in all kinds of variants, without departing from the scope of the invention.

The invention claimed is:

1. A device for generating hydroelectric energy making use of a current of water of a river or estuary, comprising:
   a paddlewheel that can freely turn in two directions around a shaft;
   wherein the paddlewheel includes at least one electricity generator set having a drive shaft coupled to a shaft of the paddlewheel; and
   a system to keep the paddlewheel in place against the current;
   wherein the paddlewheel is self-floating;
   wherein the generator set is provided on either side of the paddlewheel;
   wherein the drive shaft of a first generator set turns in a first direction of rotation with the shaft of the paddlewheel and is free to turn in a second direction of rotation, and the drive shaft of a second generator set is free to turn in the first direction of rotation and turns in the second direction of rotation with the shaft of the paddlewheel.

2. The device according to claim 1, wherein the shaft is above a water level of the river or estuary.

3. The device according to claim 1, wherein the paddlewheel is provided with a number of paddles, at least one of which is always at least partially in the water during use.

4. The device according to claim 3, wherein the paddles are rotatable at their base with respect to the shaft by an action of a first hinge mechanism, and further comprising a first adjustment mechanism that enables an angle of rotation of the paddles with respect to a radial direction to be locked in a desired rotated position.

5. The device according to claim 4, wherein the first hinge mechanism enables rotation around a geometric axis that extends parallel to the shaft of the paddlewheel.

6. The device according to claim 4, wherein the paddles include two or more segments that are rotatable by an action of a second hinge mechanism with respect to one another around a geometric axis parallel to the shaft of the paddlewheel, and further comprising a second adjustment mechanism able to lock the angle between the segments in a desired position.

7. The device according to claim 1, wherein the generator set is affixed on a floating supporting structure.

8. The device according to claim 7, wherein a floating capacity of the paddlewheel and a floating capacity of the supporting structure are such that, when the paddlewheel and the supporting structure with the generator set floats separately and freely on the water, a height of the shaft of the paddlewheel corresponds to a height of the drive shaft of the generator set.

9. The device according to claim 7, wherein the paddlewheel can freely move up and down with respect to the supporting structure.

10. The device according to claim 9, wherein the shaft of the paddlewheel is held in a vertical guide of the supporting structure.

11. The device according to claim 1, wherein the first or second generator set includes a freewheel that enables free rotation in one direction and forms a fixed turning coupling in another direction of rotation.

12. The device according to claim 1, wherein the first or second generator set includes a transmission between a generator and the shaft of the paddlewheel, wherein the transmission includes a mechanism to reverse a direction of rotation of the shaft of the generator with respect to the paddlewheel to ensure that the generator is always driven in the same direction of rotation irrespective of the direction of rotation of the paddlewheel.

13. A plurality of devices according to claim 1, wherein the devices are placed in the tidal river or estuary at a distance from one another when viewed in a direction of a flow of the tidal river or the estuary, and are spread over a distance of the tidal river or the estuary such that at least one of the devices is always in a zone with the flow.

14. A device for generating hydroelectric energy making use of a current of water of a river or estuary, comprising:
- a paddlewheel that can freely turn in two directions around a shaft;
- wherein the paddlewheel includes at least one electricity generator set having a drive shaft coupled to a shaft of the paddlewheel; and
- a system to keep the paddlewheel in place against the current;
- wherein the paddlewheel is self-floating;
- wherein the generator set is provided on either side of the paddlewheel;
- wherein the first or second generator set includes a transmission between a generator and the shaft of the paddlewheel, wherein the transmission includes a mechanism to reverse a direction of rotation of the shaft of the generator with respect to the paddlewheel to ensure that the generator is always driven in the same direction of rotation irrespective of the direction of rotation of the paddlewheel.

* * * * *